United States Patent [19]

Krieg

[11] Patent Number: 4,757,977
[45] Date of Patent: Jul. 19, 1988

[54] UNIVERSAL CHAIN GUIDE FOR ORBITAL PIPE MACHINES

[76] Inventor: Adrian H. Krieg, 119 Maple Vale Dr., Woodbridge, Conn. 06525

[21] Appl. No.: 58,556

[22] Filed: Jun. 5, 1987

[51] Int. Cl.⁴ .............................................. B23K 7/04
[52] U.S. Cl. ...................................... 266/56; 83/744; 83/825; 83/826
[58] Field of Search .................... 266/56; 83/744, 825, 83/826; 24/241 SP, 241 SB; 474/107, 155, 218, 219, 221; 81/3.43, 65.2; 7/139

[56] References Cited

U.S. PATENT DOCUMENTS

| | | | |
|---|---|---|---|
| 1,462,249 | 7/1923 | Slama | 24/241 SP |
| 1,538,011 | 5/1925 | St. Pierre | 24/241 SP |
| 2,364,170 | 12/1944 | Sonntag | 81/65.2 |
| 3,063,697 | 11/1962 | Galezniak | 266/56 |
| 3,555,239 | 1/1971 | Kerth | 266/56 |
| 3,688,615 | 9/1972 | Protze et al. | 266/56 |
| 4,424,611 | 1/1984 | Mori | 24/241 SP |

*Primary Examiner*—Wayland Stallard
*Attorney, Agent, or Firm*—John H. Crozier

[57] ABSTRACT

An orbital pipe machine guiding system to guide the machine around the circumference of a pipe has a link chain having first and second ends and a length equal to at least the circumference of the pipe and has means to attach the link chain to itself around and against the pipe in a circle perpendicular to the longitudinal axis of the pipe. At least one wheel is operatively connected to the machine, such that when the wheel is positioned for revolving engagement with the link chain, the machine will be guided in the circle defined by the link chain. In one embodiment, the wheel has a continuous slot formed therein extending radially inward from the periphery thereof, and the inside surfaces of the slot slidingly engage the link chain. Any one link chain may be used for several pipe sizes and the fastening arrangement of the link chain is such that surplus chain overlaps a portion of the chain lying against the pipe. The slot in the wheel extends far enough to accommodate such overlap.

11 Claims, 2 Drawing Sheets

UNIVERSAL CHAIN GUIDE FOR ORBITAL PIPE MACHINES

BACKGROUND OF THE INVENTION

1. Field of the Invention

This invention relates generally to means for guiding machines which orbit the circumference of pipe while performing their functions, and more particularly to a link chain guide for use with a plurality of pipe sizes and one which assures that the machines will define a generally circular path lying in a plane perpendicular to the longitudinal axis of the pipe.

2. Background Art

The types of machines for which the present invention is applicable are well known and include those that, in performing their functions, must orbit the circumference of pipe in a circle lying in a plane perpendicular to the longitudinal axis of the pipe. Such devices include orbital pipe cutting and beveling devices and ultrasonic inspection devices. An example of the former type of device is the VERSIFLAME ® Pipe Cutting & Beveling Machine manufactured by Mathey International Limited Inc. These types of devices may be driven by either electric, pneumatic, or hydraulic motors or they may be manually advanced.

The essential problem of causing a machine to orbit a pipe in a true circle derives from the fact that most pipe is not true dimensionally. The pipe is sometimes oval, sometimes conical, or sometimes conical in two directions on the same pipe; and, consequently, straight cutting or inspecting of pipe utilizing machinery tracking on and dependent upon the surface O.D. of the pipe is very difficult. With pipe which is not true dimensionally, unless some type of guiding mechanism is provided to urge the machine to travel in a circle in a plane perpendicular to the longitudinal axis of the pipe, the machine will actually tend to follow a helical path relative to the perpendicular axis of the pipe.

Conventionally, such machines are rotated about the pipe on a ring containing a rack-gear-and-pinion arrangement. The advantage of this system when cutting pipe is that the torch follows the true path of the ring. The disadvantages are that, first, if the pipe is not round, but oval, an out-of-round attachment is required in order to maintain a constant torch-tip-to-cut-surface distance. Second, such rings are limited in pipe diameter cutting sizes so that it is necessary to have many rings and gears to cut only conventional pipes from 4" O.D. to 36" O.D. This makes the accessories required for such machines very expensive. Other conventional techniques employed to maintain a true path utilize a metal belt which is wrapped around the pipe and on its edges, the orbital machine travels. This system likewise is expensive, requiring many different belts for a range of pipe sizes. Another system of orbital machines, and the one for which the present invention is primarily intended, travel around the circumference of the pipe on wheels, or bogies, and may be propelled by a variety of means. This latter system also suffers from the problems of true circular tracking discussed above, when pipe is not true dimensionally.

It is a principal object of the present invention to provide means by which it is possible when utilizing an orbital machine tracking on the pipe surface, to track on a path lying in a plane perpendicular to the longitudinal axis of the pipe.

It is another object of the invention to provide such a device which can accomplish the above ends using a minimum of accessory equipment, while being able to be employed for a large range of pipe sizes.

Other objects of the present invention will in part be obvious and will in part appear hereinafter.

SUMMARY OF THE INVENTION

The present invention provides, in one embodiment, for tracking of an orbital machine of the type which travels around the circumference of pipe on a bogie through the use of a link chain guide placed around the pipe and against which the walls of a closely fitting groove in a radially aligned pair of wheels of the bogie move. The link chain guide is placed around the pipe in a generally circular path in a plane perpendicular to the longitudinal axis of the pipe, so that the machine is urged toward following the circular path. In another embodiment, the link chain guide is used in cooperation with a single grooved wheel and follower of the torch mechanism of a pipe cutting machine. In each case, the link chain and the associated wheels are so arranged that the link chain may be considerably longer in length than the circumference of a smaller pipe size, so that a single link chain may be employed for a plurality of larger pipe sizes as well.

DETAILED DESCRIPTION OF THE INVENTION

Figure 1:
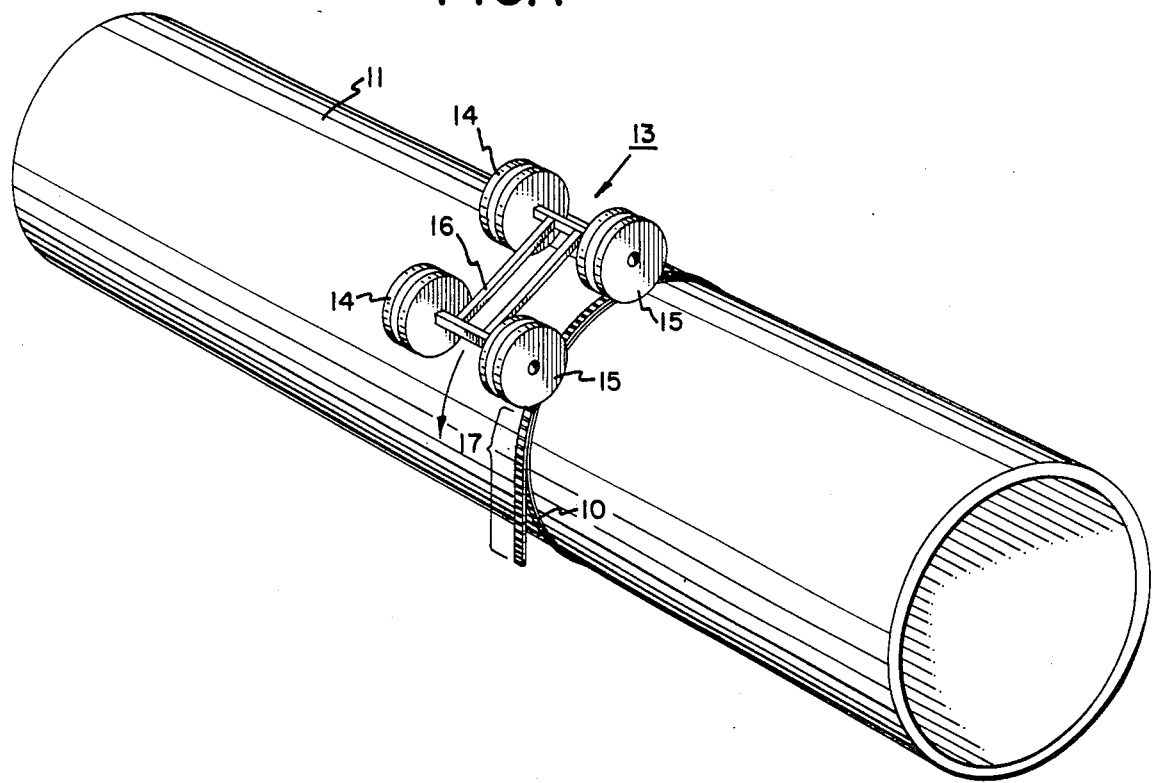
FIG. 1 is a perspective view of the present invention as applied to the bogie of an orbital pipe machine.

Referring now to the Drawing, FIG. 1 shows a link chain 10 wrapped around the circumference of a pipe 11. It may be assumed that link chain 10 has been placed around the pipe 11 in a circle lying in a plane perpendicular to the longitudinal axis of the pipe through the technique of drawing tight around the pipe a relatively wide leather strap forced into a cylindrical form parallel to longitudinal axis of the pipe, marking along one edge of the strap, removing the strap, aligning the link chain with the mark, and attaching the link chain to itself. Also shown is a bogie 13, which may be assumed to be carrying a pipe cutting machine or some other orbital machine. Bogie 13 has wheel pairs 14 and 15 rotatably attached to the frame 16 of the bogie to movingly contact the surface of the pipe 11 and to carry the machine around the circumference thereof. The wheels of wheel pair 15 are slotted so as to slidingly engage the vertical sides of link chain 10 and be guided thereby in a circular path on the surface of the pipe. It can be seen that the link chain 10 has and overlap 17 in the direction of travel of the bogie 13 (see arrow).

Figure 2:
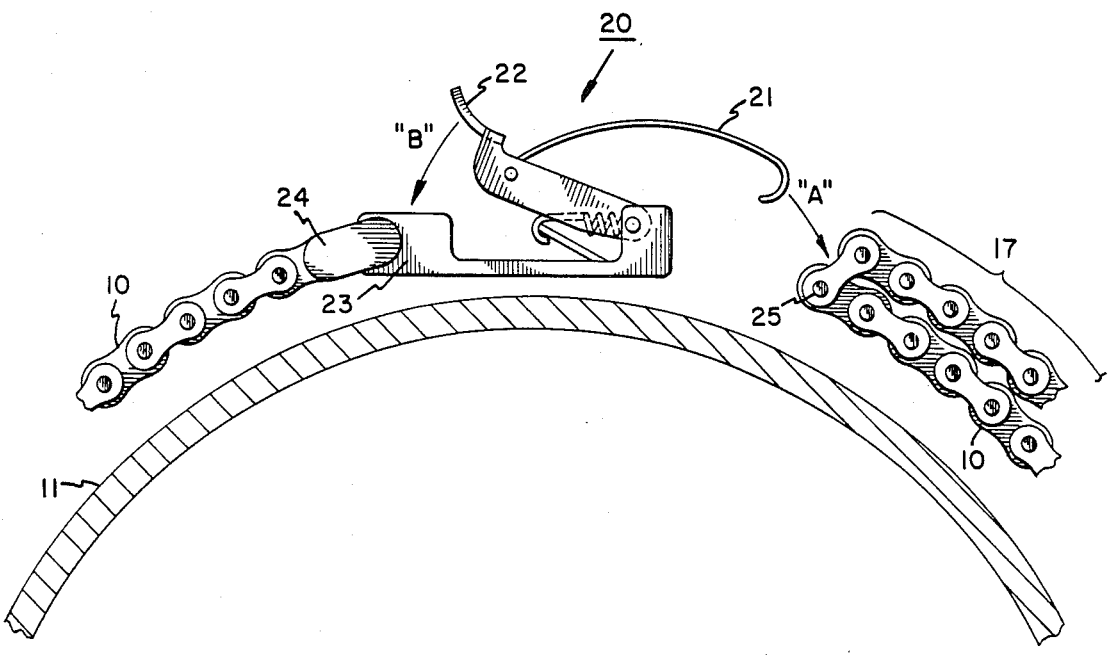
FIG. 2 shows a detail of the device to latch the link chain of FIG. 1.

FIG. 2 is a side view showing the means by which link chain 10 is attached to itself, which means includes a tension latch, generally indicated by the reference numeral 20. The tension latch 20 is shown in a partially open position and includes a spring drawhook 21, a handle 22, and a base 23. The base 23 is pivotally attached to link chain 10 by master link 24. Attachment of link chain 10 is completed by further opening tension latch 20 so that spring drawhook 21 moves in direction "A" to engage link end 25 on link chain 10. Handle 22 is then moved in direction "B" to its closed and locked position. Link end 25 is so selected as to provide the desired lock-up load on link chain 10 and may, of course, be the end link, if the chain is of exactly the proper length. Any excess of link chain 10 forms overlap 17 which lies against a portion of the link chain. The tension latch employed may be as manufactured by Rexnord Specialty Fastener Group or may be of any other design which provides the required tension to secure link chain 10 on pipe 11.

Figure 3:
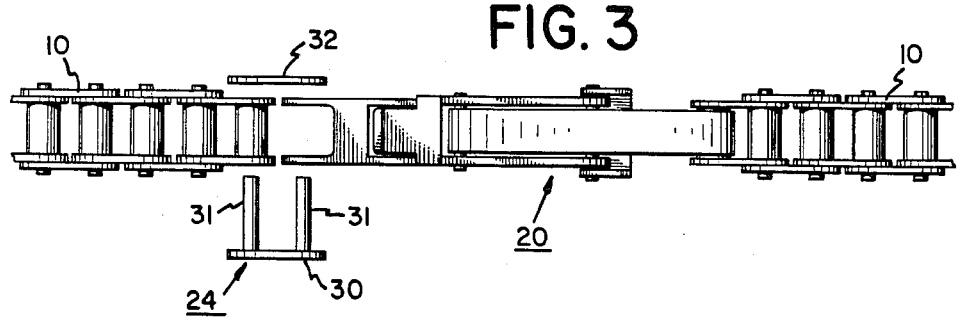
FIG. 3 shows a detail of the latch of FIG. 2.

FIG. 3 includes a detail of master link 24 of FIG. 2, which comprises an end plate 30, pins 31, and securing plate 32. To attach tension latch 20 to the end of link chain 10, pins 31 are inserted through the ends of link chain 10 and tension latch 20 and then snapped into securing plate 32. The use of master link 24 is not necessary for the practicing of the present invention, but with the use of such link, tension latch 20 may be removed and used with link chains of other lengths.

Figure 4:
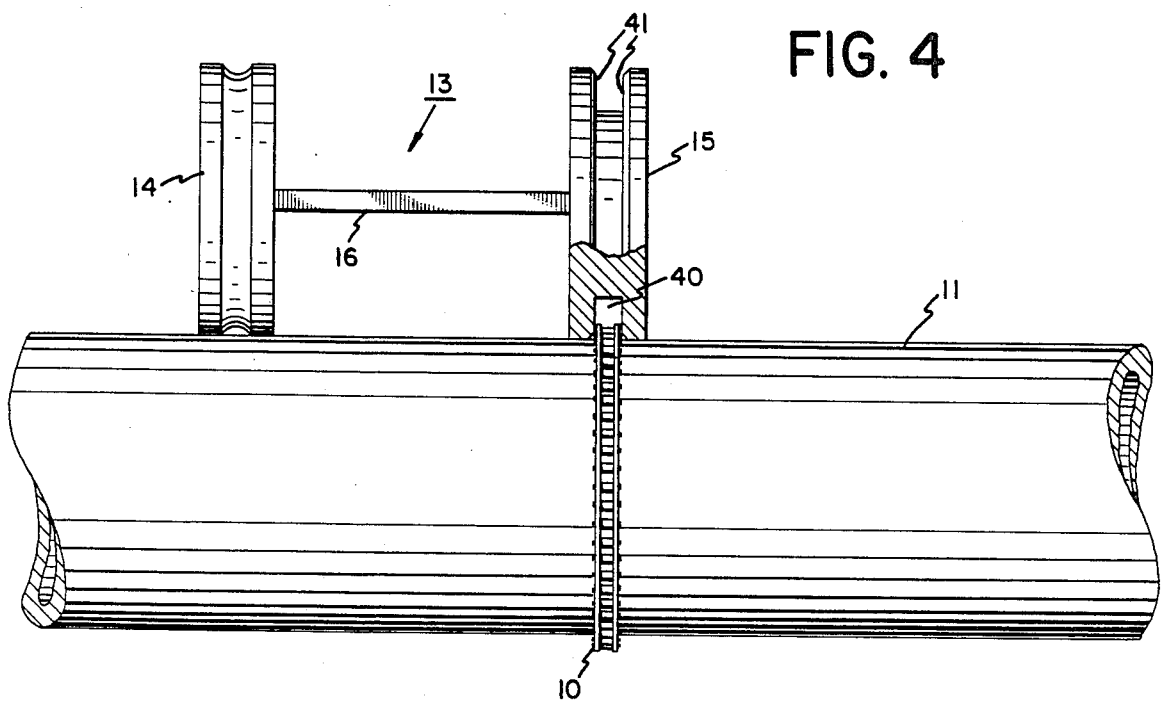
FIG. 4 shows a detail of FIG. 1.

FIG. 4 is a detail of FIG. 1 and shows wheel 15 in partial cross-section. The cross-section of wheel 15 reveals slot 40 which is cut deep enough to accommodate the overlap 17 (See FIGS. 1 and 2) of link chain 10. Sides 41 of slot 40 slidingly engage the edges of link chain 10 to guide bogie 13 in a circular path around pipe 11.

Figure 5:
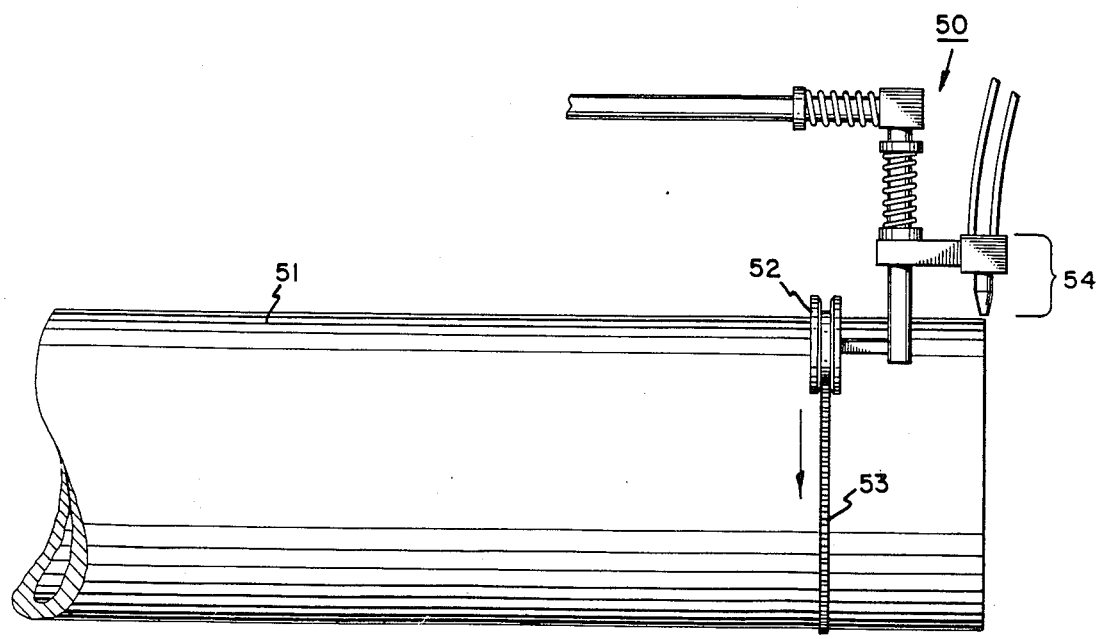
FIG. 5 is a perspective view of the present invention as applied to the torch mechanism of a pipe cutting machine.

FIG. 5 shows an embodiment of the present invention as part of a spring biased straight and true pipe cutting device, generally indicated by the reference numeral 50, mounted to pipe 51. Cutting device 50 includes a single slotted wheel 52 slidingly engaging link chain 53 which has been attached to pipe 51 as described above with reference to FIGS. 1 through 3 for link chain 10. A cutting torch 54 is mounted as shown so that wheel 52 will act as both an axial guide and as a contour follower. Wheel 52 thus will keep the torch in a circular path around pipe 51 in a plane perpendicular to the longitudinal axis thereof and, a the wheel moves radially in response to any out-of-roundness of the pipe, torch 54 will follow the same movement, thus allowing an extremely accurate cut and/or bevel. This embodiment may be employed to replace the rings commonly used to guide such devices.

It will be apparent to one skilled in the art that a number of variations are included within the scope of the present invention. In particular, it can be seen that a wheel need not be slotted for engagement with the link chain, but that the orbital machine could be arranged so that an outer edge of a face of the wheel could slidingly bear against one vertical side of the chain. Likewise, with a slotted wheel, it may be arranged that only one side of the slot need bear against one vertical side of the chain. A particular advantage of the present invention, as mentioned above, is that a few link chains may be used to cover a broad range of pipe sizes because of the accommodation of overlap of excess link chain. For example, a link chain approximately" in length may be used on nominal pipe sizes from 3.5" to 6". Similarly, a link chain approximately 52" in length may be used on nominal pipe sizes from 8" to 16", and a link chain approximately 112" in length for pipes 18" to 36". Thus, accessories for an orbital machine of the types considered above can consist, according to the present invention, of as little as three link chains and one tension latch to accommodate pipes ranging in size from 3.5" to 36".

Thus, what has been described is a novel guide for orbital pipe machines which assures tracking of the machines in a circle lying in a plane perpendicular to the longitudinal axis of the pipe and one that may be employed for a plurality of pipe sizes.

It will thus be seen that the objects set forth above, among those made apparent from the preceding description, are efficiently attained and, since certain changes may be made in the above construction without departing from the scope of the invention, it is intended that all matter contained in the above description or shown on the accompanying Drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An orbital pipe machine guiding system to guide a machine around the circumference of a pipe, wherein the system comprises:
   (a) a link chain having first and second ends and having a length equal to at least the circumference of the pipe;
   (b) means to attach the link chain to itself around and against the pipe in a circle perpendicular to the longitudinal axis of the pipe; and
   (c) a wheeled bogie operatively connected to to the machine, the wheeled bogie having at least one wheel such that when the wheel is positioned for revolving engagement with the link chain, with at least one vertical surface of the wheel in sliding engagement with at least one vertical side of the chain, the machine will be guided in the circle defined by the link chain.

2. A system, as defined in claim 1, wherein the means to attach the link chain comprises a tension latch having a base and a spring drawhook pivotally attached to the base, with the base pivotally attached to the first end of the link chain and the spring drawhook releasably attached to one link of the link chain such that the link chain is held tensioned agianst the periphery of the pipe.

3. A system, as defined in claim 2, wherein the base of the tension latch is removably attached to the first end of the link chain by a master link.

4. A system, as defined in claim 1, wherein the wheel has a continuous slot formed therein extending radially inward from the periphery thereof, and when the wheel is positioned for revolving engagement with the link chain, at least one inner side of the slot will slidingly engage the link chain.

5. A system, as defined in claim 4, wherein the one link to which the spring drawhook is attached is intermediate the first and second ends of the link chain such that the balance of the link chain between the one link and the second end may overlap a portion of the link chain held against the pipe.

6. A system, as defined in claim 5, wherein the slot formed in the wheel extends to such extend that any overlap of the link chain above the link chain lying against the pipe will be accommodated within the slot.

7. An orbital pipe machine guiding system, comprising:
   (a) a link chain having first and second ends and having a length equal to at least the circumference of the pipe;

(b) means to attach the link chain to itself around and against the pipe in a circle perpendicular to the longitudinal axis of the pipe; and (c) a wheeled bogie having an aligned pair of wheels which have continuous slots extending radially inward from the peripheries thereof, the sides of the slots slidingly engaging the link chain and being guiding thereby in the circle.

8. A guide, as defined in claim 7, wherein the means to attach the link chain comprises a tension latch having a base and a spring drawhook pivotally attached to the base, with the base pivotally attached to the first end of the link chain and the spring drawhook releasably attached to one link of the link chain such that the link chain is held tensioned against the periphery of the pipe.

9. A guide, as defined in claim 8, wherein the base of the tension latch is removably attached to the first end of the link chain by a master link.

10. A guide, as defined in claim 9, wherein the one link to which the spring drawhook is attached is intermediate the first and second ends of the link chain such that the balance of the link chain between the one link and the second end may overlap a portion of the link chain held against the pipe.

11. A guide, as defined in claim 10, wherein any overlap of the link chain above the link chain lying against the pipe will be accommodated within the continuous slots.

* * * * *